UNITED STATES PATENT OFFICE.

CARL V. PETRAEUS, OF PHILADELPHIA, PENNSYLVANIA.

IMPROVEMENT IN PROCESSES FOR MANUFACTURING ALUMINA AND CARBONATE OF SODA.

Specification forming part of Letters Patent No. 222,153, dated December 2, 1879; application filed September 30, 1879.

*To all whom it may concern:*

Be it known that I, CARL VALDEMAR PETRAEUS, of Philadelphia, State of Pennsylvania, have invented a new and useful Process of Manufacturing Alumina and Carbonate of Soda from the Minerals known as "Bauxite" and "Cryolite," of which the following is a specification sufficient to enable those skilled in the art to which my invention appertains to practice the same.

Hitherto in the manufacture of soda and alumina from bauxite and cryolite it has been usual to mix lime with said bauxite and cryolite, and to treat the mixture in a furnace. In that case, however, the silica, invariably present in the bauxite, combines with alumina and forms insoluble compounds. Further, the oxide of iron of the bauxite combines with soda, and prevents the soda from dissolving a part of the alumina. Further, in the process invented by me for the manufacture of alumina and carbonate of soda from bauxite and cryolite, which consists in mixing divided bauxite with a roasted mixture of cryolite and caustic lime, and then boiling the compound in water and treating the solution with carbonic-acid gas, as described in an application for Letters Patent bearing even date herewith, it is impossible to utilize the insoluble part of the bauxite, as it becomes mixed with the insoluble parts of the cryolite and lime in the process of boiling.

To obviate these difficulties, and at the same time enable the insoluble portions of bauxite to be obtained unmixed with the insoluble parts of the cryolite and caustic lime, is the object of my invention.

I practice my process as follows: Cryolite and caustic lime are roasted in the ordinary manner, and the product is leached with water. The solution is separated from the sediment in any suitable manner. The resulting solution of neutral aluminate of soda is then boiled with bauxite, whereby alumina is dissolved and acid aluminate of soda is formed in solution. This solution is drawn off from the sediment of silicate of alumina and other impurities, and is then treated with carbonic-acid gas to produce hydrated-alumina precipitate and carbonate of soda in solution.

The alumina may be collected in the usual manner, and the soda evaporated to soda-ash or crystal soda.

I have found that the following proportions of materials may be employed in said process, viz: one hundred parts of cryolite, one hundred and twenty-five parts of lime slaked to dry powder, and ten parts of bauxite of sixty-five per cent. alumina. These proportions, however, may be departed from without changing the nature of my invention.

Having thus described my invention, I claim and desire to secure by Letters Patent of the United States—

The process of manufacturing hydrated alumina and carbonate of soda from cryolite and bauxite, which consists in treating a roasted mixture of cryolite and caustic lime with water, separating the solution from the sediment, and boiling the liquor with bauxite, separating the liquor last formed from the sediment, and treating said liquor with carbonic-acid gas, substantially as described.

In testimony whereof I have hereunto signed my name this 25th day of September, A. D. 1879.

CARL V. PETRAEUS.

In presence of—
J. BONSALL TAYLOR,
W. C. STRAWBRIDGE.